United States Patent
Wu

(10) Patent No.: US 11,948,121 B2
(45) Date of Patent: Apr. 2, 2024

(54) SYSTEM FOR AUTOMATIC LOADING / UNLOADING AND RELATED DEVICES

(71) Applicant: Beijing Tusen Zhitu Technology Co., Ltd., Beijing (CN)

(72) Inventor: Nan Wu, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 520 days.

(21) Appl. No.: 17/001,227

(22) Filed: Aug. 24, 2020

(65) Prior Publication Data
US 2021/0103880 A1 Apr. 8, 2021

Related U.S. Application Data

(63) Continuation of application No. PCT/CN2018/105468, filed on Sep. 13, 2018.

(30) Foreign Application Priority Data
Feb. 24, 2018 (CN) .......................... 201810157585.6

(51) Int. Cl.
*G06Q 10/083* (2023.01)
*B65G 67/04* (2006.01)
(Continued)

(52) U.S. Cl.
CPC .......... *G06Q 10/083* (2013.01); *B65G 67/04* (2013.01); *B65G 67/24* (2013.01); *B66F 9/063* (2013.01);
(Continued)

(58) Field of Classification Search
CPC ...... G06Q 10/083; B65G 67/04; B65G 67/24; B66F 9/063; B66F 9/0755; G05D 1/0274; G05D 2201/0216
See application file for complete search history.

(56) References Cited

U.S. PATENT DOCUMENTS 9,114,719 B1 * 8/2015 Failing .................... B60L 55/00
2002/0143672 A1 10/2002 Sawasaki
(Continued)

FOREIGN PATENT DOCUMENTS

CN 102890510 A 1/2013
CN 103617515 A 3/2014
(Continued)

OTHER PUBLICATIONS

Homayouni, Seyed Mahdi, and Tang, Sai Hong, "Multi Objective Optimization of Coordinated Scheduling of Cranes and Vehicles at Container Terminals," Mathematical Problems in Engineering, vol. 2013, Hindawi Publishing Corporation, 2013, pp. 1-9.*
(Continued)

*Primary Examiner* — Nathan Erb
(74) *Attorney, Agent, or Firm* — Perkins Coie LLP

(57) ABSTRACT

The present disclosure provides a system for automatic loading/unloading and related devices, capable of achieving fully automated goods transportation within a particular area. The system includes: an autonomous driving control device (1) configured to control the autonomous vehicle to autonomously move to a loading/unloading destination upon receiving a transportation instruction containing the loading/unloading destination and transmit a standby message to a management system (2); and control the autonomous vehicle to leave the loading/unloading destination upon receiving a loading/unloading completion instruction; the management system (2) configured to transmit the transportation instruction to the autonomous driving control device (1) and transmit a loading/unloading instruction to a loading/unloading control device (3) upon receiving the standby message; and transmit the loading/unloading completion instruction to the autonomous driving control device (1) upon receiving a loading/unloading completion message (Continued)

transmitted from the loading/unloading control device (3), and the loading/unloading control device (3) configured to control a loading/unloading device to load goods onto or unload goods from the autonomous vehicle upon receiving the loading/unloading instruction, and transmit the loading/unloading completion message to the management system (2) when the loading/unloading is completed.

17 Claims, 3 Drawing Sheets

(51) Int. Cl.
 *B65G 67/24* (2006.01)
 *B66F 9/06* (2006.01)
 *B66F 9/075* (2006.01)
 *G05D 1/00* (2006.01)

(52) U.S. Cl.
 CPC ......... *B66F 9/0755* (2013.01); *G05D 1/0274* (2013.01); *G05D 2201/0216* (2013.01)

(56) References Cited

U.S. PATENT DOCUMENTS

| | | | |
|---|---|---|---|
| 2004/0233041 A1 | 11/2004 | Busboom | |
| 2008/0252417 A1* | 10/2008 | Thomas | G06Q 10/08 340/10.1 |
| 2010/0021272 A1* | 1/2010 | Ward | B66C 19/002 700/214 |
| 2015/0278759 A1* | 10/2015 | Harris | G06Q 10/08355 705/338 |
| 2019/0149952 A1* | 5/2019 | Parks, Jr. | G08G 1/202 705/26.82 |
| 2020/0159221 A1 | 5/2020 | Wu | |

FOREIGN PATENT DOCUMENTS

| | | |
|---|---|---|
| CN | 206162676 U | 5/2017 |
| CN | 106875139 A | 6/2017 |
| CN | 107390689 A | 11/2017 |
| CN | 107403206 A | 11/2017 |
| CN | 107403294 A | 11/2017 |
| CN | 2017390689 A | 11/2017 |

OTHER PUBLICATIONS

Office Action in Chinese Patent Application No. 201810157585.6 dated Jul. 21, 2021.
International Application No. PCT/CN2018/105468, International Search Report and Written Opinion, dated Dec. 5, 2018 (pp. 1-14).
International Application No. PCT/CN2018/105468, International Preliminary Report on Patentabilty, dated Aug. 27, 2020 (pp. 1-4).
Chinese Application No. 201810157585.6, filed Feb. 24, 2018, First Search Report, dated Sep. 27, 2020. (pp. 1-2).
Chinese Application No. 201810157585.6, filed Feb. 24, 2018, Supplementary Search, dated Mar. 3, 2021. (pp. 1-2).
Chinese Application No. 201810157585.6, filed Feb. 24, 2018, Office Action dated Mar. 11, 2021.
European Application No. 3757914 Extended European Search Report dated Oct. 7, 2021, pp. 1-11.
Australian Patent & Trademark Office, Australian Application No. 2018409988, 1st Examination Report, dated Oct. 17, 2023, 4 pages.
Examination report from Australian Patent Application No. 2018409988, dated Jan. 30, 2023, (4 pages).

* cited by examiner

SYSTEM FOR AUTOMATIC LOADING / UNLOADING AND RELATED DEVICES

CROSS-REFERENCES TO RELATED APPLICATIONS

The present document is a continuation of and claims priority to International Patent Application No. PCT/CN2018/105468, filed on Sep. 13, 2018 which further claims the benefit of priority of Chinese Patent Application No. 201810157585.6, filed on Feb. 24, 2018. The content of the above-identified applications is incorporated herein by reference in its entirety.

TECHNICAL FIELD

The present disclosure relates to autonomous driving technology, and more particularly, to a system for automatic loading/unloading, an autonomous driving control device, a management system and a loading/unloading control device.

BACKGROUND

Currently, in some large ports, containers are carried by trucks in a port area from ships a yard or from the yard to the ships. The trucks in the port area are driven by truck drivers, and truck drivers cannot work continuously 24 hours a day. Therefore, at least 2-3 truck drivers are needed for a truck. However, due to the large number of trucks in the port area, a large number of truck drivers are needed, resulting in a high cost. Furthermore, there may be many vehicles and containers in the port area, and the working environment of truck drivers is dangerous. Therefore, how to achieve a fully automated goods transportation in the port area to reduce the cost has become a technical problem to be solved.

SUMMARY

In view of the above problem, the present disclosure provides a system for automatic loading/unloading, capable of achieving fully automated goods transportation within a particular area (e.g., a coastal port area, a highway port area, a mining area, a large warehouse, a goods distribution center, a campus, or the like).

In a first aspect, a system for automatic loading/unloading is provided according to an embodiment of the present disclosure. The system includes a management system, a loading/unloading control device, and an autonomous driving control device provided on an autonomous vehicle. The autonomous driving control device is configured to control the autonomous vehicle to autonomously move to a loading/unloading destination upon receiving a transportation instruction containing the loading/unloading destination and transmit a standby message to the management system; and control the autonomous vehicle to leave the loading/unloading destination upon receiving a loading/unloading completion instruction. The management system is configured to transmit the transportation instruction to the autonomous driving control device and transmit a loading/unloading instruction to the loading/unloading control device upon receiving the standby message; and transmit the loading/unloading completion instruction to the autonomous driving control device upon receiving a loading/unloading completion message transmitted from the loading/unloading control device. The loading/unloading control device is configured to control a loading/unloading device to load goods onto or unload goods from the autonomous vehicle upon receiving the loading/unloading instruction, and transmit the loading/unloading completion message to the management system when the loading/unloading is completed.

In a second aspect, an autonomous driving control device is provided according to an embodiment of the present disclosure. The autonomous driving control device includes: a communication unit configured to receive a transportation instruction containing a loading/unloading destination and a loading/unloading completion instruction, and transmit a standby message to a management system; and a control unit configured to control an autonomous vehicle to autonomously move to the loading/unloading destination when the communication unit receives the transportation instruction, and transmit the standby message to the management system via the communication unit; and control the autonomous vehicle to leave the loading/unloading destination when the communication unit receives the loading/unloading completion instruction.

In a third aspect, a management system is provided according to an embodiment of the present disclosure. The management system includes: a communication unit configured to transmit a transportation instruction containing a loading/unloading destination to an autonomous driving control device and transmit a loading/unloading instruction to a loading/unloading control device upon receiving a standby message transmitted from the autonomous driving control device; and transmit a loading/unloading completion instruction to the autonomous driving control device upon receiving a loading/unloading completion message transmitted from the loading/unloading control device; and a management unit configured to generate the transportation instructions based on a transportation task assigned to the autonomous vehicle, and transmit the transportation instruction to the autonomous driving control device of the autonomous vehicle via the communication unit.

In a fourth aspect, a loading/unloading control device is provided according to an embodiment of the present disclosure. The loading/unloading control device includes: a communication unit configured to receive a loading/unloading instruction from a management system, and transmit a loading/unloading completion message to the management system, and a control unit configured to control a loading/unloading device to load goods onto or unload goods from an autonomous vehicle located at a loading/unloading destination in the loading/unloading instruction when the communication unit receives the loading/unloading instruction, and transmit the loading/unloading completion message to the management system via the communication unit when the loading/unloading is completed.

In a fifth aspect, a system for automatic loading/unloading is provided according to an embodiment of the present disclosure. The system includes a management system, a loading/unloading control device, and an autonomous driving control device provided on an autonomous vehicle. The autonomous driving control device is configured to control the autonomous vehicle to autonomously move to a loading/unloading destination upon receiving a transportation instruction containing the loading/unloading destination and transmit a standby message to the management system; and control the autonomous vehicle to leave the loading/unloading destination upon receiving a loading/unloading completion instruction. The management system is configured to transmit the transportation instruction to the autonomous driving control device and transmit a loading/unloading instruction to the loading/unloading control device upon receiving the standby message. The loading/unloading control device is configured to control a loading/unloading device to load goods onto or unload goods from the autonomous vehicle upon receiving the loading/unloading instruction, and transmit the loading/unloading completion instruction to the autonomous driving control device when the loading/unloading is completed.

In a sixth aspect, a loading/unloading control device is provided according to an embodiment of the present disclosure. The loading/unloading control device includes: a communication unit configured to receive a loading/unloading instruction from a management system, and transmit a loading/unloading completion instruction to an autonomous driving control device, and a control unit configured to control a loading/unloading device to load goods onto or unload goods from an autonomous vehicle located at a loading/unloading destination in the loading/unloading instruction when the communication unit receives the loading/unloading instruction, and transmit the loading/unloading completion instruction to the autonomous driving control device via the communication unit when the loading/unloading is completed.

With the technical solutions according to the embodiments of the present disclosure, communication control among the management system, the autonomous driving control device on the autonomous vehicle, and the loading/unloading control device is performed to allow the autonomous vehicle to transport goods in a particular area, thereby achieving fully automated goods transportation within the particular area (e.g., a coastal port area, a mining area, a highway port area, a warehouse, a goods distribution center, a campus, or the like). It does not need to have truck drivers for each truck, so as to reduce the cost.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. It is apparent to those skilled in the art that the figures described below only illustrate some embodiments of the present disclosure and other figures can be obtained from these figures without applying any inventive skills. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

The solutions according to the present disclosure can be applied in some particular areas such as coastal port areas, highway port areas, mining areas, goods distribution centers, warehouses, logistics park, or the like. The present disclosure is not limited to any specific application scenario of the solutions according to the present disclosure. The following embodiments will be described as being applied in a port area as an example, and similar technical principles can be applied in other application scenarios.

Embodiment 1

Figure 1:
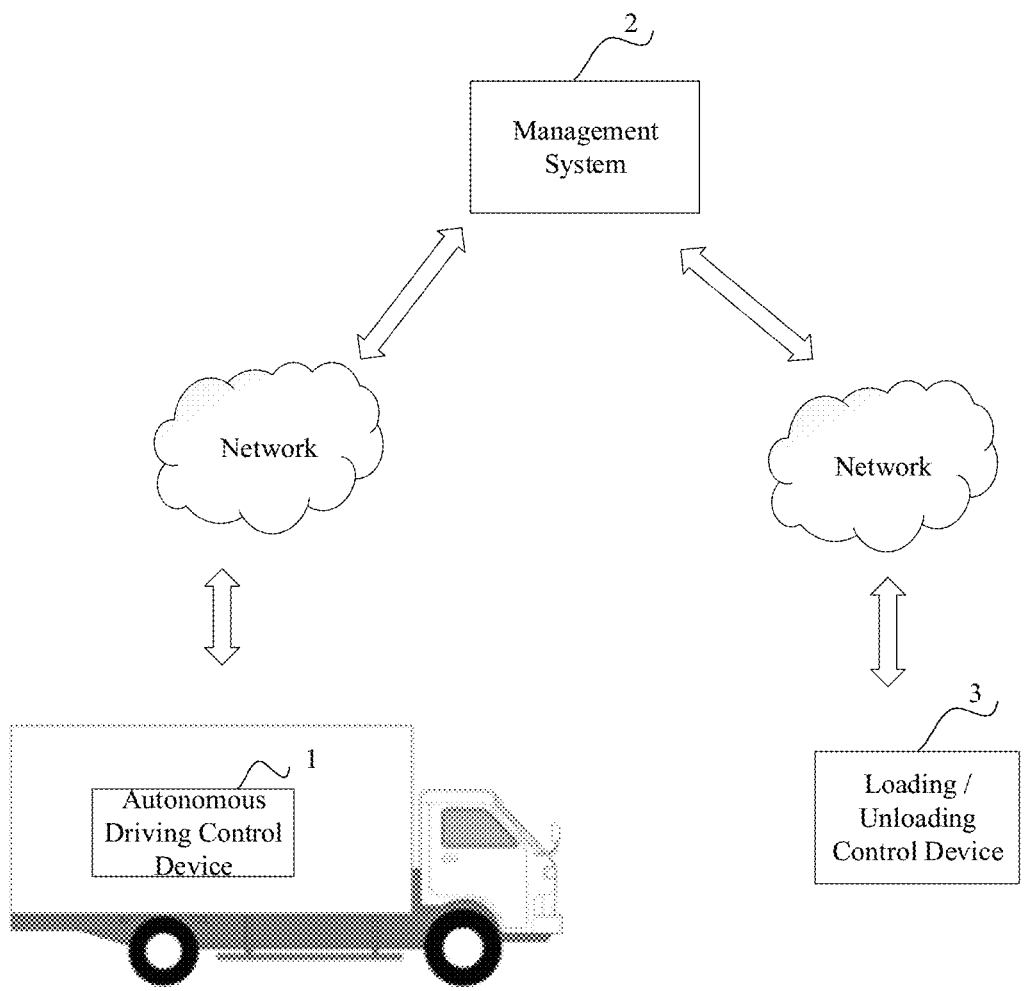
FIG. 1 is a first schematic diagram showing a structure of a system for automatic loading/unloading according to an embodiment of the present disclosure.

Referring to FIG. 1, which is a schematic diagram showing a structure of a system for automatic loading/unloading according to an embodiment of the present disclosure, the system includes an autonomous driving control device 1 provided on an autonomous vehicle, a management system 2 and a loading/unloading control device 3.

The autonomous driving control device 1 is configured to control the autonomous vehicle to autonomously move to a loading/unloading destination upon receiving a transportation instruction containing the loading/unloading destination and transmit a standby message to the management system; and control the autonomous vehicle to leave the loading/unloading destination upon receiving a loading/unloading completion instruction.

In the embodiment of the present disclosure, the autonomous driving control device 1 may be installed on a vehicle-mounted Digital Signal Processor (DSP), Field-Programmable Gate Array (FPGA) controller, industrial computer, vehicle computer, Electronic Control Unit (ECU), or Vehicle Control Unit (VCU).

The management system 2 is configured to transmit the transportation instruction to the autonomous driving control device 1 and transmit a loading/unloading instruction to the loading/unloading control device 3 upon receiving the standby message; and transmit the loading/unloading completion instruction to the autonomous driving control device 1 upon receiving a loading/unloading completion message transmitted from the loading/unloading control device 3.

The loading/unloading control device 3 is configured to control a loading/unloading device to load goods onto or unload goods from the autonomous vehicle upon receiving the loading/unloading instruction, and transmit the loading/unloading completion message to the management system 2 when the loading/unloading is completed.

In an embodiment of the present disclosure, the loading/unloading device may be a bridge crane (i.e., a shore crane), a rail crane, a tire crane, a tower crane, a reach stacker, an overhead crane, a mobile crane, a robot, a forklift, etc. The present disclosure is not limited to any of these.

The management system 2 may be a port management system in the port area, which manages, schedules and remotely monitors all autonomous vehicles and loading/unloading devices in the port area. Identity information and vehicle type of each autonomous vehicle, identity information of each loading/unloading device and the loading/unloading location it is responsible for, and identity information (such as number, IP address, Media Access Control (MAC) address, etc.) of the loading/unloading control device corresponding to each loading/unloading device in the port area can be pre-registered in the management system 2. For example, a tire crane may be responsible for loading/unloading of containers at one or more loading/unloading locations in one or more yards, and a bridge crane may be responsible for loading/unloading of containers at one or more loading/unloading locations at a dock. Each autonomous vehicle can periodically synchronize its own position information and vehicle status information (for example, including status information such as busy or idle status) to the management system 2. The management system 2 can generate a transportation task for each autonomous vehicle managed by the management system 2 based on a container transportation tasks and the current position and the vehicle status information of the autonomous vehicle, store the transportation task for each autonomous vehicle, generate a transportation instruction containing a loading/unloading destination based on the transportation task for the autonomous vehicle, and transmit the transportation instruction to the autonomous driving control device of the autonomous vehicle.

In an embodiment of the present disclosure, the autonomous driving control device 1 and the management system 2 can be connected by means of wireless communication. For example, they can communicate with each other using conventional wireless communication schemes such as Bluetooth, Local Area Network (LAN), infrared or the like. Alternatively, the autonomous driving control device 1 can be provided with a Vehicle-to-Everything (V2X) device and the management system 2 can be provided with a V2X device, such that the autonomous driving control device 1 and the management system 2 can communicate with each other using the V2X communication technology. Likewise, the loading/unloading control device 3 and the management system 2 can be connected by means of wireless communication. For example, they can communicate with each other using conventional wireless communication schemes such as Bluetooth, LAN, infrared or the like. Alternatively, the management system 2 can be provided with a V2X device and the loading/unloading control device 3 can be provided with a V2X device, such that the loading/unloading control device 3 and the management system 2 can communicate with each other using the V2X communication technology.

In an embodiment of the present disclosure, the autonomous driving control device 1 being configured to control the autonomous vehicle to autonomously move to the loading/unloading destination may include the autonomous driving control device 1 being configured to: determine a driving route from a current position as a start point and the loading/unloading destination as an end point, and control the autonomous vehicle to move from the current position to the loading/unloading destination along the driving route.

In an embodiment of the present disclosure, the autonomous driving control device 1 can determine the driving route by planning the driving route based on locally stored map data. Alternatively, the management system 2 can plan the driving route based on locally stored map data and include the driving route in the transportation instruction for transmission to the autonomous driving control device 1, and the autonomous driving control device 1 can obtain the driving route from the transportation instruction. Therefore, in an embodiment of the present disclosure, the autonomous driving control device 1 can determine the driving route from the current position as the start point and the loading/unloading destination as the end point in any of the following schemes.

Scheme A1: The autonomous driving control device 1 can plan the driving route from the current position as the start point and the loading/unloading destination as the end point based on pre-stored map data.

In Scheme A1, the autonomous driving control device 1 can plan the driving route using its own navigation software, or the autonomous driving control device 1 can plan the driving route using third-party map software.

Scheme A2: The autonomous driving control device 1 can obtain from the transportation instruction the driving route from the current position to the loading/unloading destination.

In Scheme A2, the driving route is composed of path points constituting the driving route, and the autonomous driving control device 1 can sequentially display the route points in the transportation instruction on a local map, and use the driving route displayed on the map as a navigation route to control the vehicle to move from the current position to the loading/unloading destination.

Of course, if the current position of the autonomous vehicle is outside the particular area of the loading/unloading destination (for example, port area, mining area, logistics park, warehouse, goods distribution center, etc.), in addition to the above Scheme A1 and Scheme A2, those skilled in the art can use the following Scheme A3.

Scheme A3: The transportation instruction may contain an in-area driving route from an entrance of the particular area to the loading/unloading destination. The autonomous driving control device 1 can plan an out-of-area driving route from the current position to the entrance of the particular area based on the stored map data, and control the autonomous vehicle to move from the current position to the entrance of the particular area in accordance with the out-of-area driving route, and then move from the entrance of the particular area to the loading/unloading destination in accordance with the in-area driving route in the transportation instruction.

In an embodiment of the present disclosure, in an example, in addition to the loading/unloading destination, the transportation instruction may also include any one or more of the following information: identity information of the autonomous vehicle (such as a license plate number or the vehicle number), loading/unloading indication information (loading indication information or unloading indication information), loading/unloading time, a driving route to the loading/unloading destination.

In the port area, a corresponding parking space is provided for each loading/unloading location in advance, and the parking spaces are numbered. Each loading/unloading device (such as tire crane, rail crane, bridge crane, overhead crane, tower crane, mobile crane, etc.) corresponds to one or more parking spaces. The loading/unloading control device corresponding to the loading/unloading device controls the loading/unloading device to load containers onto or unload containers from the autonomous vehicles parked in the parking space. Upon receiving the transportation instruction transmitted from the management system 2, the autonomous driving control device of the autonomous vehicle controls the autonomous vehicle to move to the loading/unloading destination and stop at the parking space corresponding to the loading/unloading destination in a predetermined posture. The loading/unloading device responsible for the loading/unloading destination loads containers onto or unloads containers from the autonomous vehicle.

In an example, the loading/unloading destination in the transportation instruction can be position information (i.e., coordinate information) of a loading/unloading location. In this example, the position information corresponding to each loading/unloading location can be pre-stored in the management system 2. In another example, the loading/unloading destination in the transportation instruction can be a parking space number of a loading/unloading location. In this example, a correspondence between parking space numbers and their position information can be pre-stored in the autonomous driving control device 1. When the autonomous driving control device 1 receives the transportation instruction, it can determine the position information corresponding to the loading/unloading destination from the correspondence.

In an embodiment of the present disclosure, the correspondence between loading/unloading locations and loading/unloading control devices 3 may be stored in the management system 2 in advance (for example, it may be a correspondence between location information of the loading/unloading locations and the loading/unloading control devices 3, or it may be a correspondence between the parking space numbers of the loading/unloading locations and the loading/unloading control devices 3, or a correspondence between the parking space numbers of the loading/unloading locations and the numbers of the loading/unloading control devices 3, the present disclosure is not limited to any of these). The standby message (in the embodiment of the present disclosure, the standby message may be a standby message) may contain the identity information of the autonomous vehicle and the loading/unloading destination. The management system 2 being configured to transmit the loading/unloading instruction to the loading/unloading control device 3 may include the management system 2 being configured to: determine the loading/unloading control device corresponding to the loading/unloading destination from the pre-stored correspondence between loading/unloading locations and loading/unloading control devices 3, and transmit the loading/unloading instruction to the determined loading/unloading control device 3.

In an embodiment of the present disclosure, a correspondence between vehicle identity information of autonomous vehicles and container numbers can be pre-stored in the management system 2. When the loading/unloading instruction is a loading instructions, the management system 2 is further used for the management system is further configured to: determine a container number corresponding to the autonomous vehicle based on the pre-stored correspondence between vehicle identity information and container numbers, and include the loading/unloading destination and the container number in the loading/unloading instruction. Accordingly, the loading/unloading control device 3 being configured to control the loading/unloading device to load goods onto or unload goods from the autonomous vehicle may include the loading/unloading control device 3 being configured to control the loading/unloading device to load a container corresponding to the container number in the loading/unloading instruction onto the autonomous vehicle located at the loading/unloading destination.

In an embodiment of the present disclosure, when the loading/unloading instruction is an unloading instruction, the loading/unloading control device 3 being configured to control the loading/unloading device to load goods onto or unload goods from the autonomous vehicle may include the loading/unloading control device 3 being configured to control the loading/unloading device to unload a container from the autonomous vehicle located at the loading/unloading destination.

In an embodiment of the present disclosure, due to a large internal area of some particular areas, it may be needed to transport containers at different locations. For example, in the port area, it may be needed to use an autonomous vehicle to transport a container from a yard to a bridge crane such that the bridge crane can load the container onto a ship, or to use an autonomous vehicle to transport a container unloaded from a ship by a bridge crane to a yard inside the port area. Therefore, in an embodiment of the present disclosure, the transportation instruction may further contain a transportation destination. The autonomous driving control device 1 being configured to control the autonomous vehicle to leave the loading/unloading destination may include the autonomous driving control device 1 being configured to: determine a driving route from the loading/unloading destination as a start point and the transportation destination as an end point, and control the autonomous vehicle to move from the loading/unloading destination to the transportation destination along the driving route.

In an embodiment of the present disclosure, the autonomous driving control device 1 can determine the driving route from the loading/unloading destination as the start point and the transportation destination as the end point in any of the following schemes.

Scheme B1: The autonomous driving control device 1 can plan the driving route from the loading/unloading destination as the start point and the transportation destination as the end point based on pre-stored map data.

In Scheme B1, the autonomous driving control device 1 can plan the driving route using its own navigation software, or the autonomous driving control device 1 can plan the driving route using third-party map software.

Scheme B2: The autonomous driving control device 1 can obtain from the transportation instruction the driving route from the loading/unloading destination to the transportation destination.

In Scheme B2, the driving route is composed of path points constituting the driving route, and the autonomous driving control device 1 can sequentially display the route points in the transportation instruction on a local map, and use the driving route displayed on the map as a navigation route to control the vehicle to move from the current position to the loading/unloading destination.

In an embodiment of the present disclosure, in order to further achieve automatic loading/unloading with the autonomous vehicle, when the transportation instruction indicates that a container is to be transported to the loading/unloading destination, the autonomous driving control device 1 can be further configured to control a fastener for fixing the container on the autonomous vehicle to be unlocked before transmitting the standby message to the management system 2; and/or, when the transportation instruction indicates that a container is to be loaded at the loading/unloading destination, the autonomous driving control device 1 can be further configured to control the fastener on the autonomous vehicle to be locked for fixing the loaded container after receiving the loading/unloading completion instruction.

Figure 2:
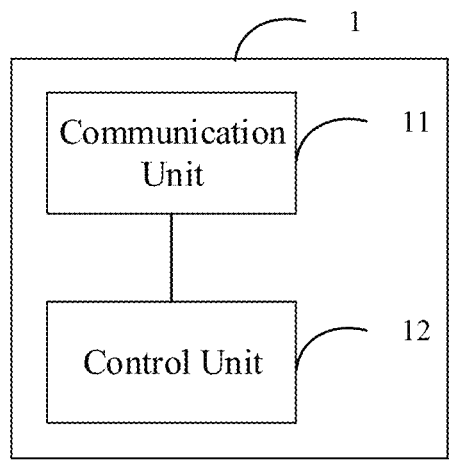
FIG. 2 is a schematic diagram showing a structure of an autonomous driving control device according to an embodiment of the present disclosure.

In Embodiment 1 of the present disclosure, the above autonomous driving control device 1 may have a structure as shown in FIG. 2, including the following units.

A communication unit 11 is configured to receive a transportation instruction containing a loading/unloading destination and a loading/unloading completion instruction, and transmit a standby message to a management system.

A control unit 12 is configured to control an autonomous vehicle to autonomously move to the loading/unloading destination when the communication unit 11 receives the transportation instruction, and transmit the standby message to the management system via the communication unit 11; and control the autonomous vehicle to leave the loading/unloading destination when the communication unit 11 receives the loading/unloading completion instruction.

In the embodiment of the present disclosure, the communication unit 11 may transmit and receive information wirelessly, e.g., via an antenna on the autonomous vehicle.

The control unit 12 may run on a processor (e.g., a CPU) of a DSP, an FPGA controller, an industrial computer, a vehicle computer, an ECU, or a VCU mounted on the vehicle. The control unit 12 may include a processor and at least one memory storing at least one machine executable instruction. The processor is configured to read and execute the at least one machine executable instruction to implement the corresponding operations and functions.

In an embodiment of the present disclosure, the control unit 12 being configured to control the autonomous vehicle to autonomously move to the loading/unloading destination may include the control unit 12 being configured to: determine a driving route from a current position as a start point and the loading/unloading destination as an end point, and control the autonomous vehicle to move from the current position to the loading/unloading destination along the driving route.

In an embodiment of the present disclosure, the control unit 12 being configured to determine the driving route from the current position as the start point and the loading/unloading destination as the end point may include the control unit 12 being configured to: plan the driving route from the current position as the start point and the loading/unloading destination as the end point based on pre-stored map data, or obtain from the transportation instruction the driving route from the current position to the loading/unloading destination. For further details, reference can be made to the above Scheme A1, Scheme A2, and Scheme A3, and the description thereof will be omitted here.

In an embodiment of the present disclosure, the transportation instruction may further contain a transportation destination, and the control unit 12 being configured to control the autonomous vehicle to leave the loading/unloading destination may include the control unit 12 being configured to determine a driving route from the loading/unloading destination as a start point and the transportation destination as an end point, and control the autonomous vehicle to move from the loading/unloading destination to the transportation destination along the driving route.

The control unit 12 can determine the driving route starting from the loading/unloading destination as the start point and the transportation destination as the end point in any of the above Scheme B1 and Scheme B2, and the details thereof will be omitted here.

When the transportation instruction indicates that a container is to be transported to the loading/unloading destination, the control unit 12 can be further configured to control a fastener for fixing the container on the autonomous vehicle to be unlocked before transmitting the standby message to the management system via the communication unit 11, and/or when the transportation instruction indicates that a container is to be loaded at the loading/unloading destination, the control unit 12 can be further configured to control the fastener on the autonomous vehicle to be locked for fixing the loaded container after the communication unit 11 receives the loading/unloading completion instruction.

Figure 3:
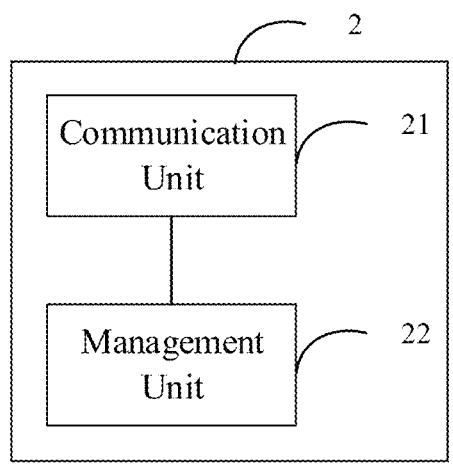
FIG. 3 is a schematic diagram showing a structure of a management system according to an embodiment of the present disclosure.

In some embodiments, the above management system 2 may have a structure as shown in FIG. 3, including a communication unit 21 and a management unit 22.

The communication unit 21 is configured to transmit a transportation instruction containing a loading/unloading destination to an autonomous driving control device and transmit a loading/unloading instruction to a loading/unloading control device upon receiving a standby message transmitted from the autonomous driving control device; and transmit a loading/unloading completion instruction to the autonomous driving control device upon receiving a loading/unloading completion message transmitted from the loading/unloading control device.

The management unit 22 is configured to generate the transportation instructions based on a transportation task assigned to the autonomous vehicle, and transmit the transportation instruction to the autonomous driving control device of the autonomous vehicle via the communication unit 21.

In an embodiment of the present disclosure, when the communication unit 21 receives the loading/unloading completion instruction, the management unit 22 can mark the corresponding transportation task stored locally as in a completed state or can delete the transportation task.

The management system 2 may run a hardware device such as a DSP, an FPGA controller, a desktop computer, a mobile computer, a PAD, or a single-chip microcomputer.

In an embodiment of the present disclosure, the communication unit 21 may transmit and receive information wirelessly, e.g., via an antenna.

The management unit 22 may run on a processor (e.g., a CPU) of a DSP, an FPGA controller, a desktop computer, a mobile computer, or a PAD. The management unit 22 may include a processor and at least one memory storing at least one machine executable instruction. The processor is configured to read and execute the at least one machine executable instruction to implement the corresponding operations and functions.

In an embodiment of the present disclosure, a port area transportation task is recorded in the management system 2 in advance. The port area transportation task includes container transportation tasks corresponding to respective containers in the port area. Each container corresponds to a container transportation task. The container transportation task can be e.g., "Transport container N to unloading destination A" or "Load container N at loading destination A" or "Load container N at loading destination A and transport container N from loading destination A to transportation destination B". The management system 2 assigns one or more container transportation tasks to each autonomous vehicle in the port area, generates a corresponding transportation instruction for each container transportation task, and transmits the transportation instruction to the corresponding autonomous vehicle.

In an example, the standby message may contain identity information of the autonomous vehicle and the loading/unloading destination. The management unit 22 being configured to transmit the transportation instruction to the autonomous driving control device of the autonomous vehicle via the communication unit 21 may include the management unit 22 being configured to: determine the loading/unloading control device corresponding to the loading/unloading destination from a pre-stored correspondence between loading/unloading locations and loading/unloading control devices, and transmit the loading/unloading instruction to the determined loading/unloading control device via the communication unit 21.

For details of the correspondence between the loading/unloading locations and the loading/unloading control devices, reference can be made to the above content and the description thereof will be omitted here.

In an example, the communication unit 21 can be further configured to receive position information uploaded from the autonomous vehicle. The management unit 22 can be further configured to plan a driving route from a current position of the autonomous vehicle as a start point to the loading/unloading destination in the transportation task corresponding to the autonomous vehicle as an end point based on locally stored map data, and add the driving route to the transportation instruction.

The management unit 22 can plan the driving route as described above, for which reference can be made to the above content and the description thereof will be omitted here.

Figure 4:
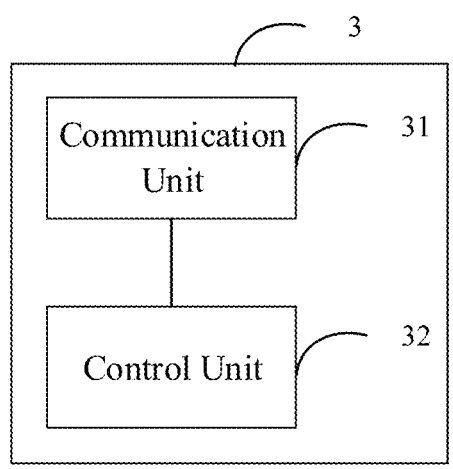
FIG. 4 is a schematic diagram showing a structure of a loading/unloading control device according to an embodiment of the present disclosure.

In an embodiment of the present disclosure, the above loading/unloading control device 3 may have a structure as shown in FIG. 4, including a communication unit 31 and a control unit 32.

The communication unit 31 is configured to receive a loading/unloading instruction from a management system, and transmit a loading/unloading completion message to the management system.

The control unit 32 is configured to control a loading/unloading device to load goods onto or unload goods from an autonomous vehicle located at a loading/unloading destination in the loading/unloading instruction when the communication unit 31 receives the loading/unloading instruction and transmit the loading/unloading completion message to the management system via the communication unit when the loading/unloading is completed.

In an embodiment of the present disclosure, the communication unit 31 may transmit and receive information wirelessly, e.g., via an antenna.

The control unit 32 may run on a processor (e.g., a CPU) of a DSP, an FPGA controller, a desktop computer, a mobile computer or a PAD. The DSP, FPGA controller, desktop computer, mobile computer, or PAD in which the control unit 32 is installed can be provided on the loading/unloading device, or may be provided at a location near the loading/unloading device. The control unit 32 may include a processor and at least one memory storing at least one machine executable instruction. The processor is configured to read and execute at least one machine executable instruction to implement the corresponding operations and functions.

In an example, when the loading/unloading instruction is a loading instruction, the loading/unloading instruction may contain the loading/unloading destination and a container number. The control unit 32 being configured to control the loading/unloading device to load goods onto or unload goods from the autonomous vehicle located at the loading/unloading destination in the loading/unloading instruction may include the control unit 32 being configured to control the loading/unloading device to load a container corresponding to the container number in the loading/unloading instruction onto the autonomous vehicle located at the loading/unloading destination.

In an example, when the loading/unloading instruction is an unloading instruction, the unloading instruction may contain the loading/unloading destination and a container number. The control unit 32 being configured to control the loading/unloading device to load goods onto or unload goods from the autonomous vehicle located at the loading/unloading destination in the loading/unloading instruction may include the control unit 32 being configured to control the loading/unloading device to unload the container from the autonomous vehicle located at the loading/unloading destination.

Embodiment 2

Figure 5:
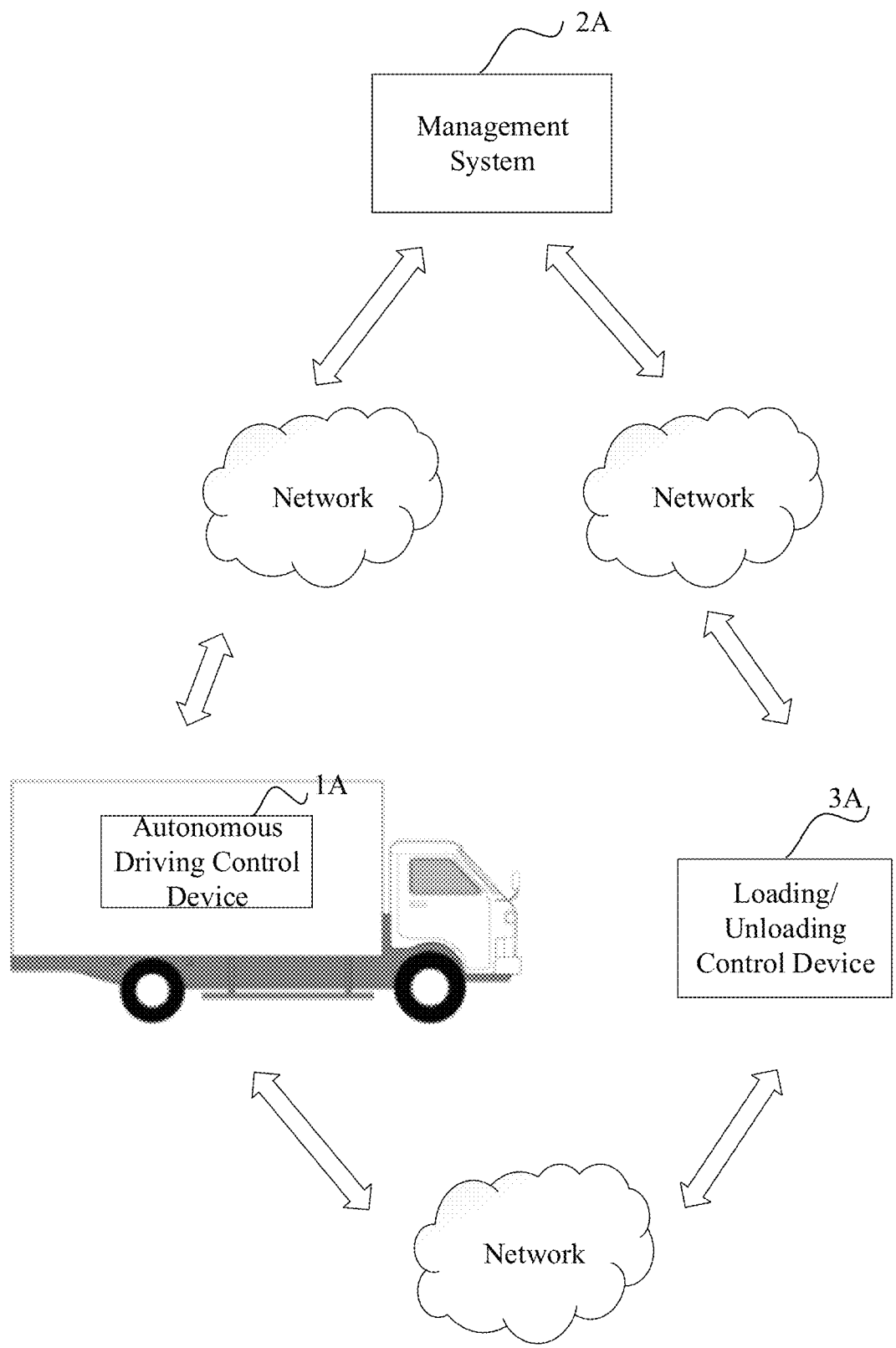
FIG. 5 is a second schematic diagram showing a structure of a system for automatic loading/unloading according to an embodiment of the present disclosure.

Embodiment 2 of the present disclosure provides another system for automatic loading/unloading. The system may have a structure as shown in FIG. 5, including an autonomous driving control device 1A provided on an autonomous vehicle, a management system 2A, and a loading/unloading control device 3A.

The autonomous driving control device 1A is configured to control the autonomous vehicle to autonomously move to a loading/unloading destination upon receiving a transportation instruction containing the loading/unloading destination and transmit a standby message to the management system 2A; and control the autonomous vehicle to leave the loading/unloading destination upon receiving a loading/unloading completion instruction.

The management system 2A is configured to transmit the transportation instruction to the autonomous driving control device 1A and transmit a loading/unloading instruction to the loading/unloading control device 3A upon receiving the standby message.

The loading/unloading control device 3A is configured to control a loading/unloading device to load goods onto or unload goods from the autonomous vehicle upon receiving the loading/unloading instruction, and transmit the loading/unloading completion instruction to the autonomous driving control device 1A when the loading/unloading is completed.

In an embodiment of the present disclosure, the autonomous driving control device 1A may have the same structure as that has been described above with reference to the structure of the autonomous driving control device 1 in Embodiment 1, and the description thereof will be omitted here.

In an embodiment of the present disclosure, the management system 2A has the following structure, including a communication unit and a management unit.

The communication unit is configured to transmit the transportation instruction containing the loading/unloading destination to the autonomous driving control device, and transmit the loading/unloading instruction to the loading/unloading control device upon receiving the standby message.

The management unit is configured to generate the transportation instruction based on a transportation task assigned to the autonomous vehicle, and transmit the transportation instruction to the autonomous driving control device of the autonomous vehicle via the communication unit.

For details of the management unit, reference can be made to the content related to the management unit 22 in Embodiment 1, and the description thereof will be omitted here.

In Embodiment 2 of the present disclosure, upon receiving the loading/unloading completion instruction transmitted from the loading/unloading control device 3A, the autonomous driving control device 1A can further transmit the loading/unloading completion instruction to the management system 2A. Upon receiving the loading/unloading completion instruction, the management system 2A can mark the corresponding transportation task stored locally as in a completed state or can delete the transportation task.

In an embodiment of the present disclosure, the autonomous driving control device 1A and the management system 2A can be connected by means of wireless communication. For example, they can communicate with each other using conventional wireless communication schemes such as Bluetooth, LAN, infrared or the like. Alternatively, the autonomous driving control device 1A can be provided with a V2X device and the management system 2A can be provided with a V2X device, such that the autonomous driving control device 1A and the management system 2A can communicate with each other using the V2X communication technology. Likewise, the loading/unloading control device 3A and the management system 2A can be connected by means of wireless communication. For example, they can communicate with each other using conventional wireless communication schemes such as Bluetooth, LAN, infrared or the like. Alternatively, the management system 2A can be provided with a V2X device and the loading/unloading control device 3A can be provided with a V2X device, such that the loading/unloading control device 3A and the management system 2A can communicate with each other using the V2X communication technology. Similarly, the autonomous driving control device 1A and the loading/unloading control device 3A can be connected by means of wireless communication. For example, they can communicate with each other using conventional wireless communication schemes such as Bluetooth, LAN, infrared or the like. Alternatively, the autonomous driving control device 1A can be provided with a V2X device and the loading/unloading control device 3A can be provided with a V2X device, such that the autonomous driving control device 1A and the loading/unloading control device 3A can communicate with each other using the V2X communication technology.

In an embodiment of the present disclosure, the loading/unloading control device 3A can include a communication unit and a control unit.

The communication unit is configured to receive a loading or unload instruction from the management system, and transmit the loading/unloading completion instruction to the autonomous driving control device;

The control unit is configured to control the loading/unloading device to goods onto or unload goods from the autonomous vehicle located at the loading/unloading destination in the loading/unloading instruction when the communication unit receives the loading/unloading instruction, and transmit the loading/unloading completion instruction to the autonomous driving control device via the communication unit when the loading/unloading is completed.

In Embodiment 2 of the present disclosure, in an example, if the loading/unloading instruction is a loading instruction, the loading/unloading instruction may contain the loading/unloading destination, a container number, and vehicle identity information. The control unit being configured to control the loading/unloading device to goods onto or unload goods from the autonomous vehicle located at the loading/unloading destination in the loading/unloading instruction may include the control unit being configured to: control the loading/unloading device to load a container corresponding to the container number in the loading/unloading instruction onto the autonomous vehicle located at the loading/unloading destination. Accordingly, the control unit being configured to transmit the loading/unloading completion instruction to the autonomous driving control device via the communication unit when the loading/unloading is completed may include the control unit being configured to: transmit the loading/unloading completion instruction to the autonomous vehicle corresponding to the vehicle identity information in the loading/unloading instruction via the communication unit.

In an example, if the loading/unloading instruction is an unloading instruction, the unloading instruction may contain the loading/unloading destination, a container number, and vehicle identity information. The control unit being configured to control the loading/unloading device to goods onto or unload goods from the autonomous vehicle located at the loading/unloading destination in the loading/unloading instruction may include the control unit being configured to: control the loading/unloading device to unload the container from the autonomous vehicle located at the loading/unloading destination. Accordingly, the control unit being configured to transmit the loading/unloading completion instruction to the autonomous driving control device via the communication unit when the loading/unloading is completed may include the control unit being configured to: transmit the loading/unloading completion instruction to the autonomous vehicle corresponding to the vehicle identity information in the loading/unloading instruction via the communication unit.

The basic principles of the present disclosure have been described above with reference to the embodiments. However, it can be appreciated by those skilled in the art that all or any of the steps or components of the method or device according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A system for automatic loading or unloading, comprising a management system, a loading or unloading control device, and an autonomous driving control device provided on an autonomous vehicle, wherein:
   the autonomous driving control device is configured to control the autonomous vehicle to autonomously move to a loading or unloading destination upon receiving a transportation instruction containing the loading or unloading destination and transmit a standby message containing the loading or unloading destination to the management system; and control the autonomous vehicle to leave the loading or unloading destination upon receiving a loading or unloading completion instruction;
   the management system is configured to:
      transmit the transportation instruction to the autonomous driving control device,
      upon receiving the standby message, determine the loading or unloading control device corresponding to the loading or unloading destination from a pre-stored correspondence between loading or unloading locations and loading or unloading control devices,
      transmit a loading or unloading instruction to the determined loading or unloading control device; and
      transmit the loading or unloading completion instruction to the autonomous driving control device upon receiving a loading or unloading completion message transmitted from the loading or unloading control device; and
   the loading or unloading control device is configured to control a loading or unloading device to load goods onto or unload goods from the autonomous vehicle upon receiving the loading or unloading instruction, and transmit the loading or unloading completion message to the management system when the loading or unloading is completed.

2. The system of claim 1, wherein the autonomous driving control device being configured to control the autonomous vehicle to autonomously move to the loading or unloading destination comprises the autonomous driving control device being configured to:
   determine a driving route from a current position as a start point and the loading or unloading destination as an end point, and
   control the autonomous vehicle to move from the current position to the loading or unloading destination along the driving route.

3. The system of claim 2, wherein the autonomous driving control device being configured to determine the driving route from the current position as the start point and the loading or unloading destination as the end point comprises the autonomous driving control device being configured to:
   plan the driving route from the current position as the start point and the loading or unloading destination as the end point based on pre-stored map data, or
   obtain from the transportation instruction the driving route from the current position to the loading or unloading destination.

4. The system of claim 1, wherein,
   when the loading or unloading instruction is a loading instruction, the management system is further configured to:
   determine a container number corresponding to the autonomous vehicle based on a pre-stored correspondence between vehicle identity information and container numbers, and
   include the loading or unloading destination and the container number in the loading or unloading instruction, and
   the loading or unloading control device being configured to control the loading or unloading device to load goods onto or unload goods from the autonomous vehicle comprises the loading or unloading control device being configured to control the loading or unloading device to load a container corresponding to the container number in the loading or unloading instruction onto the autonomous vehicle located at the loading or unloading destination.

5. The system of claim 1, wherein the transportation instruction further contains a transportation destination, and
   the autonomous driving control device being configured to control the autonomous vehicle to leave the loading or unloading destination comprises the autonomous driving control device being configured to determine a driving route from the loading or unloading destination as a start point and the transportation destination as an end point, and control the autonomous vehicle to move from the loading or unloading destination to the transportation destination along the driving route.

6. The system of claim 1, wherein,
when the transportation instruction indicates that a container is to be transported to the loading or unloading destination, the autonomous driving control device is further configured to control a fastener for fixing the container on the autonomous vehicle to be unlocked before transmitting the standby message to the management system, and
when the transportation instruction indicates that a container is to be loaded at the loading or unloading destination, the autonomous driving control device is further configured to control the fastener on the autonomous vehicle to be locked for fixing the loaded container after receiving the loading or unloading completion instruction.

7. The system of claim 1, wherein the loading or unloading device comprises a bridge crane, a tire crane, a rail crane, a tower crane, a reach stacker, an overhead crane or a mobile crane.

8. An autonomous driving control device, comprising:
a communication unit configured to:
receive a transportation instruction containing a loading or unloading destination and a loading or unloading completion instruction, and
transmit a standby message to a management system; and
a control unit configured to control an autonomous vehicle to autonomously move to the loading or unloading destination when the communication unit receives the transportation instruction, and transmit the standby message to the management system via the communication unit; and control the autonomous vehicle to leave the loading or unloading destination when the communication unit receives the loading or unloading completion instruction, wherein
in response to the transportation instruction indicating that a container is to be transported to the loading or unloading destination, the control unit is further configured to control a fastener for fixing the container on the autonomous vehicle to be unlocked before transmitting the standby message to the management system via the communication unit, and
in response to the transportation instruction indicating that a container is to be loaded at the loading or unloading destination, the control unit is further configured to control the fastener on the autonomous vehicle to be locked for fixing the loaded container after the communication unit receives the loading or unloading completion instruction.

9. The autonomous driving control device of claim 8, wherein the control unit being configured to control the autonomous vehicle to autonomously move to the loading or unloading destination comprises the control unit being configured to:
determine a driving route from a current position as a start point and the loading or unloading destination as an end point, and
control the autonomous vehicle to move from the current position to the loading or unloading destination along the driving route.

10. The autonomous driving control device of claim 9, wherein the control unit being configured to determine the driving route from the current position as the start point and the loading or unloading destination as the end point comprises the control unit being configured to:
plan the driving route from the current position as the start point and the loading or unloading destination as the end point based on pre-stored map data, or obtain from the transportation instruction the driving route from the current position to the loading or unloading destination.

11. The autonomous driving control device of claim 8, wherein
the transportation instruction further contains a transportation destination, and
the control unit being configured to:
control the autonomous vehicle to leave the loading or unloading destination comprises the control unit being configured to determine a driving route from the loading or unloading destination as a start point and the transportation destination as an end point, and
control the autonomous vehicle to move from the loading or unloading destination to the transportation destination along the driving route.

12. A method for automatic loading or unloading, comprising:
controlling, by an autonomous driving control device provided on an autonomous vehicle, the autonomous vehicle to autonomously move to a loading or unloading destination upon receiving from a management system a transportation instruction containing the loading or unloading destination;
transmitting, by the autonomous driving control device, a standby message containing the loading or unloading destination to the management system upon arriving at the loading or unloading destination so that the management system generates a loading or unloading instruction based on the standby message and transmits the loading or unloading instruction to a loading or unloading control device, wherein the loading or unloading control device corresponds to the loading or unloading destination and is determined by the management system from a pre-stored correspondence between loading or unloading locations and loading or unloading control devices;
receiving, by the autonomous driving control device, from the management system or from the loading or unloading control device, a loading or unloading completion instruction indicating that loading or unloading has been completed by a loading or unloading device under control of the loading or unloading control device; and
controlling, by the autonomous driving control device, the autonomous vehicle to leave the loading or unloading destination upon receiving the loading or unloading completion instruction.

13. The method of claim 12, wherein controlling, by an autonomous driving control device provided on an autonomous vehicle, the autonomous vehicle to autonomously move to a loading or unloading destination comprising:
determining, by the autonomous driving control device, a driving route from a current position as a start point and the loading or unloading destination as an end point; and
controlling, by the autonomous driving control device, the autonomous vehicle to move from the current position to the loading or unloading destination along the driving route.

14. The method of claim 13, wherein determining, by the autonomous driving control device, a driving route from a current position as a start point and the loading or unloading destination as an end point comprising:
planning, by the autonomous driving control device, the driving route from the current position as the start point and the loading or unloading destination as the end point based on pre-stored map data, or obtaining, by the autonomous driving control device, from the transportation instruction the driving route from the current position to the loading or unloading destination.

15. The method of claim 12, wherein the loading or unloading instruction includes the loading or unloading destination and a container number, and wherein the container number corresponds to the autonomous vehicle and is determined based on a pre-stored correspondence between vehicle identity information and container numbers.

16. The method of claim 12, wherein the transportation instruction further comprises a transportation destination, and wherein controlling, by an autonomous driving control device, the autonomous vehicle to leave the loading or unloading destination comprising:

determining, by the autonomous driving control device, a driving route from the loading or unloading destination as a start point and the transportation destination as an end point; and controlling, by the autonomous driving control device, the autonomous vehicle to move from the loading or unloading destination to the transportation destination along the driving route.

17. The method of claim 12, further comprising:

controlling, by the autonomous driving control device, a fastener for fixing a container on the autonomous vehicle to be unlocked before transmitting the standby message to the management system, or controlling, by the autonomous driving control device, the fastener on the autonomous vehicle to be locked for fixing a loaded container after receiving the loading or unloading completion instruction.

\* \* \* \* \*